US010191978B2

(12) United States Patent
Romano (10) Patent No.: US 10,191,978 B2
(45) Date of Patent: Jan. 29, 2019

(54) LABELING/NAMING OF THEMES (71) Applicant: Verint Systems Ltd., Herzilya Pituach (IL)

(72) Inventor: Roni Romano, Even Yehuda (IL)

(73) Assignee: Verint Systems Ltd., Herzilya Pituach (IL)

( * ) Notice: Subject to any disclaimer, the term of this patent is extended or adjusted under 35 U.S.C. 154(b) by 388 days.

(21) Appl. No.: 14/588,914

(22) Filed: Jan. 3, 2015

(65) Prior Publication Data

US 2015/0193532 A1 Jul. 9, 2015

Related U.S. Application Data

(60) Provisional application No. 61/923,260, filed on Jan. 3, 2014.

(51) Int. Cl.
*G06N 5/02* (2006.01)
*G06F 17/30* (2006.01)
*G06F 17/27* (2006.01)

(52) U.S. Cl.
CPC .... *G06F 17/30734* (2013.01); *G06F 17/2785* (2013.01); *G06F 17/2795* (2013.01); *G06N 5/022* (2013.01)

(58) Field of Classification Search
CPC ......... G06N 99/005; G06N 5/022; G06N 5/02
See application file for complete search history.

(56) References Cited

PUBLICATIONS

W. Plath, "Automatic Sentence Diagramming", Int'l Conf on Mach. Learn. and Applied Language Analysis, 1961, pp. 176-191.*
N. Sager, "Syntactic Analysis of Natural Language", in Advances in Computers, vol. 8, 1967, pp. 153-188.*
Y. Yaari, "Segmentation of Expository Texts by Hierarchical Agglomerative Clustering", arXiv preprint cmp-lg/9709015, 1997, 7 pages.*

\* cited by examiner

*Primary Examiner* — Vincent Gonzales
(74) *Attorney, Agent, or Firm* — Christopher M. Scherer; DeWitt Ross & Stevens S.C.

(57) ABSTRACT

By formulizing a specific company's internal knowledge and terminology, the ontology programming accounts for linguistic meaning to surface relevant and important content for analysis. The ontology is built on the premise that meaningful terms are detected in the corpus and then classified according to specific semantic concepts, or entities. Once the main terms are defined, direct relations or linkages can be formed between these terms and their associated entities. Then, the relations are grouped into themes, which are groups or abstracts that contain synonymous relations. The disclosed ontology programming adapts to the language used in a specific domain, including linguistic patterns and properties, such as word order, relationships between terms, and syntactical variations. The ontology programming automatically trains itself to understand the domain or environment of the communication data by processing and analyzing a defined corpus of communication data.

15 Claims, 7 Drawing Sheets

| top term pairs | nodes |
|---|---|
| buy, insurance | 3, 6 |
| order, life insurance | 3, 6 |
| talk to, a principal | 5, X |
| good, offer | X, X |
| talk with, the manager | 5, 9 |

| nodes | term pairs |
|---|---|
| 3, 6 | buy, insurance |
|  | order, life insurance |
| 5, 9 | talk with, the manager |

LABELING/NAMING OF THEMES

CROSS-REFERENCE TO RELATED APPLICATION

This application claims priority to U.S. Provisional Patent Application No. 61/923,260, filed Jan. 3, 2014, entitled "LABELING/NAMING OF THEMES," the disclosure of which is incorporated by reference in its entirety.

BACKGROUND

The present disclosure relates to the field of automated data processing, and more specifically to the application of ontology programming to process and analyze communication data.

An ontology is a formal representation of a set of concepts, and the relationships between those concepts in a defined domain. The ontology models the specific meanings of terms as they apply to that domain, and may be devised to incorporate one or several different spoken and/or written languages. Communication data may exist in the form of an audio recording, streaming audio, a transcription of spoken content, or any written correspondence or communication. In the merely exemplary context of a customer service interaction, the communication data may be a transcript between a customer service agent or an interactive voice response (IVR) recording with a customer/caller. The interaction may be via phone, via email, via internet chat, via text messaging, etc. An ontology can be developed and applied across all types of communication data, for example, all types of customer interactions (which may include interactions in multiple languages), to develop a holistic tool for processing and interpreting such data.

SUMMARY

The disclosed solution uses machine learning-based methods to improve the knowledge extraction process in a specific domain or business environment. By formulating a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the domain or environment of the communication data by processing and analyzing a defined corpus of communication data.

The ontology is built on the premise that meaningful terms are detected in the corpus and then classified according to specific semantic concepts, or entities. Once the main terms are defined, direct relations or linkages can be formed between these terms and their associated entities. Then, the relations are grouped into themes, which are groups or abstracts that contain synonymous relations. Relations are detected in interactions and surfaced during the system's self-training process. A theme is essentially a single concept defined by its associated relations, which represent that same concept among multiple interactions in the corpus. Themes provide users with a compressed view of the characteristics of interactions throughout the corpus. Themes may be identified according to the exemplary methods described herein.

Themes provide a basis for analytic functions of the ontological software. Accordingly, themes must be provided names, or identifiers, that summarize or identify the content of a theme so that large amounts of theme data can be integrated and displayed in a user-friendly fashion—e.g. in a user interface. In one embodiment, a theme is named based on the three most common relations in a corpus, where the first terms of each relation are grouped together and the second terms of each relation are grouped together.

DETAILED DISCLOSURE

In the context of customer service interactions, communication content may exist as various forms of data, including but not limited to audio recording, streaming audio, transcribed textual transcript, or documents containing written communications, such as email, physical mail, text messages, etc. While the present disclosure is exemplified herein by describing an embodiment involving the analysis of audio data, such as recorded audio transcripts, it is to be understood that in alternative embodiments of oral or written communications may be used or analyzed.

An ontology as disclosed is a formal representation of a set of concepts and the relationships between these concepts. In general, an ontology will focus on a specific domain or general context within which the individualized terms or classes as described herein are interpreted. As a non-limiting example, the ontologies described herein are with respect to customer service interactions. A particular ontology may be defined for a specific domain, such as financial services, consumer products, subscription services, or some other service interactions.

Figure 1:
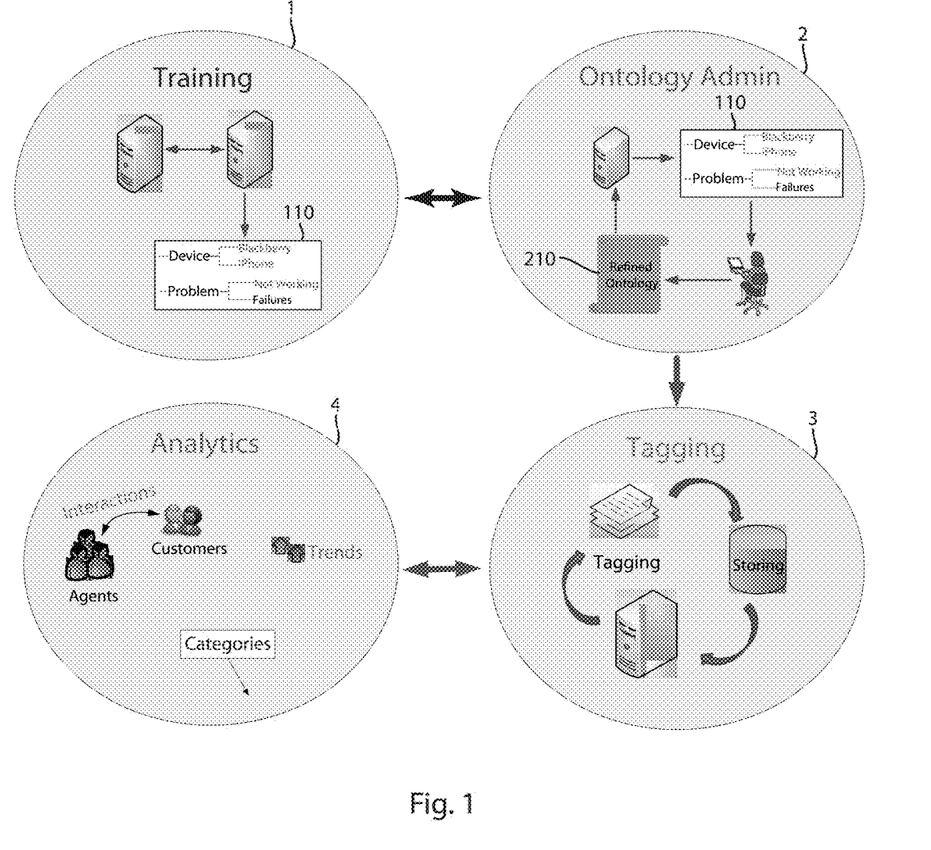
FIG. 1 depicts an exemplary embodiment of the ontology process and programming disclosed herein.

The presently disclosed ontology solution incorporates four main stages. As seen in FIG. 1, the four main stages include training 1, ontology administration 2, ontology tagging 3, and ontology analytics 4. The training step 1 involves internal machine learned in which the system learns the customer's specific domain and formulates an initial ontology 110. The initial ontology 110 is then passed to the ontology administration step 2 wherein the user reviews the initial ontology 110 and refines it to create a refined ontology 210. The refined ontology 210 is then stored and passed to the tagging module 3. Tagging is a continuous online process that uses the ontology to tag tracked items in incoming interactions, and stores the tagged interactions in a persistent repository. Finally, the tagged interactions are then used by the analytics module 4 to analyze and extract business data based on an enhanced formulization of a company's internal knowledge and terminology. A detailed analysis of each stage is addressed in turn.

In the training phase 1, communication data is transformed into a usable format and then analyzed. For example, audio data from a customer interaction between a customer service agent/IVR and a customer/caller can be automatically transcribed into a textual file through speech recognition techniques. However, challenges exist in automatically interpreting the content and sentiments conveyed in a human communication, such as a customer service interaction. An ontology, which generally refers to a collection of entities and their relations, is one way in which an automated interpretation of a customer service interaction can be developed, organized, and presented as disclosed herein.

Generally, an ontology as disclosed herein includes terms which are individual words or short phrases that represent the basic units or concepts that might come up in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. All words in the corpus can only be associated with one term, and each term can only be counted once.

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may be include "objects", "actions", "modifiers", "documents", "service", "customers", or "locations". However, these are not intended to be limiting on the types of classes, particularly the types of classes that may appear in an ontology directed to a specific or specialized domain.

The classes, subclasses, and terms are connected by a plurality of relations which are defined binary directed relationships between terms and classes/subclasses or subclasses to classes. In a non-limiting example, the term "pay" is defined under the class "action" and the term "bill" is defined in the class "documents". Still further binary directed relationships can be defined between these class/term pairs. The action/pay pair is related to the document/bill pair in that the payment action requires an underlying document, which may be a bill. In another non-limiting example, the term "broken" is defined in the class "problems" and the term "iPhone" is defined in the class "device". The problem/broken pair can also have a directed relationship to the "devices" class in which the "iPhone" term is a specific example as represented by the devices/iPhone pair.

Figure 7:
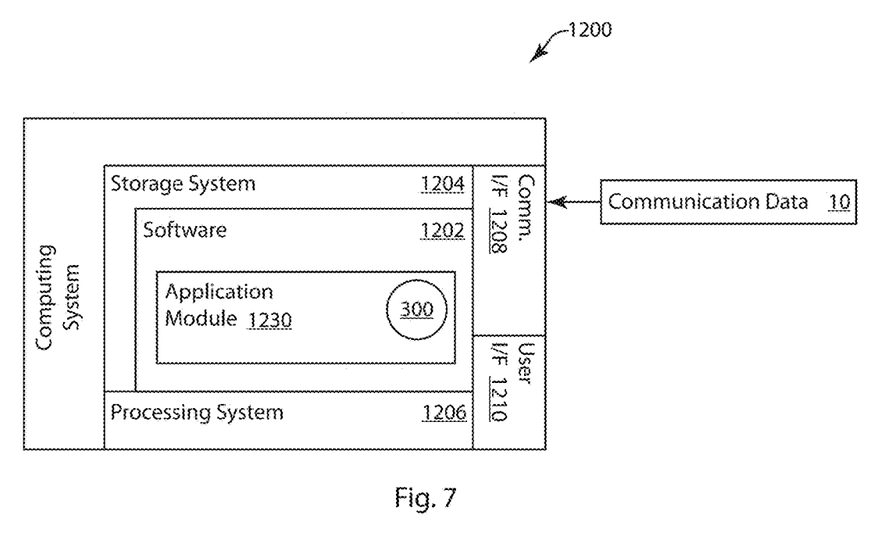
FIG. 7 is a system diagram of an exemplary embodiment of a system for automated language model adaptation implementing an ontology training module.

FIG. 7 is a system diagram of an exemplary embodiment of a system 1200 for automated language model adaptation implementing an ontology training module 300. The system 1200 is generally a computing system that includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described in herein in further detail, including execution of the ontology training module 300.

Although the computing system 1200 as depicted in FIG. 7 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio data received in real time or near-real time by the computing system 1200.

Figure 2:
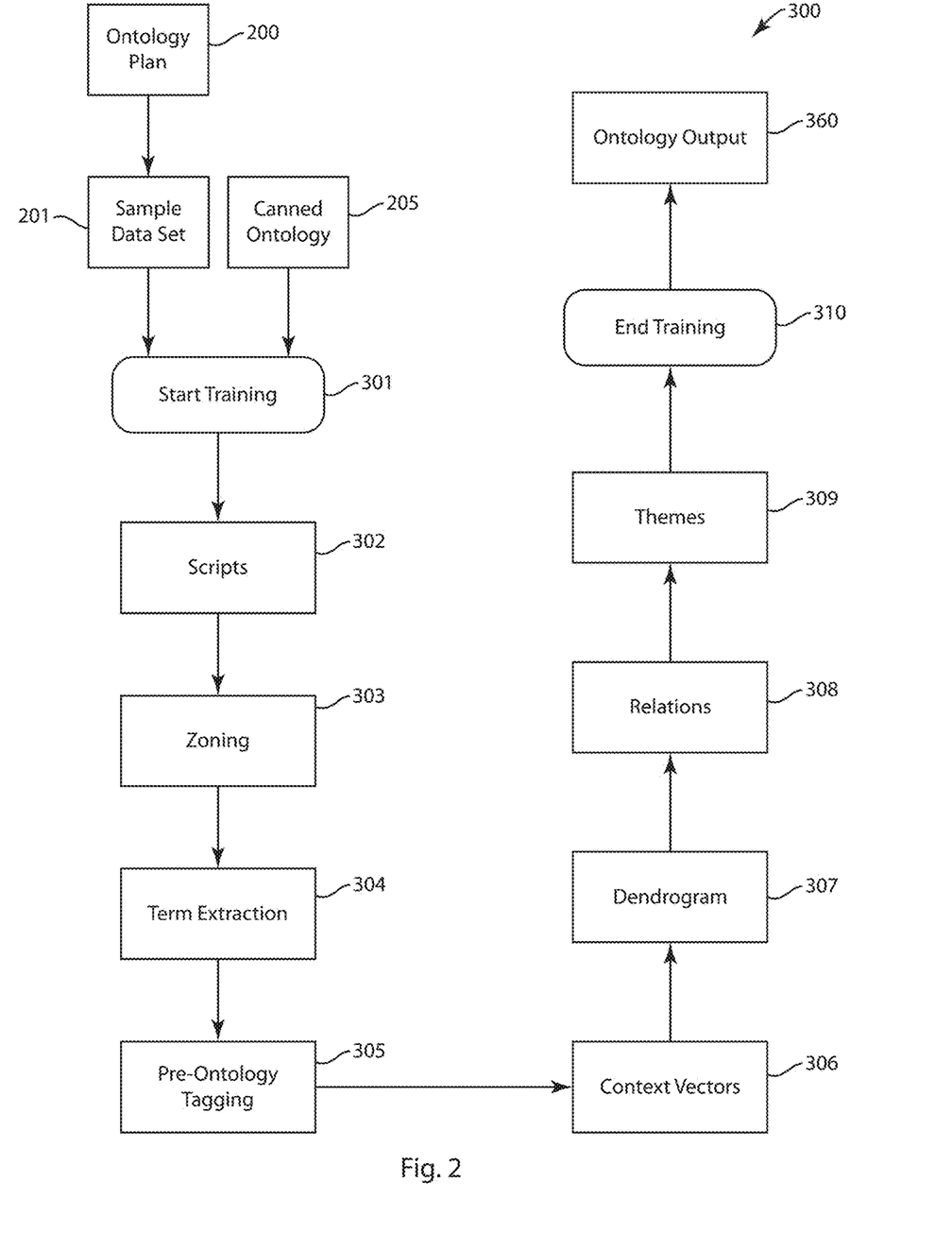
FIG. 2 is a schematic diagram of an embodiment of a process for ontology development.

FIG. 2 represents an overview of an exemplary training phase 1 for developing an initial ontology 110. The initial ontology 110 is built by a step-by-step pipeline process that applies various features to the defined data. These features include the extracting and surfacing of words and phrases in the corpus that helps users make non-trivial observations about a customer-specific domain.

As exemplified in FIG. 2, developing an ontology may begin with the prerequisite steps of developing an ontology plan 200 and sample data set 201. Developing an ontology plan 200 involves assessing a customer's business needs to develop a comprehensive plan for the ontological structure that can process the customer's data to provide the desired result. For example, developing an ontology plan 200 could involve determining how many ontologies are required for a specific customer. For example, customers may decide they need multiple ontologies to handle specialized types of data that can be categorized into different business domains.

Developing the sample data set 201 involves accumulating a good and varied range of data for each planned ontology. The data required for this purpose preferably originates from different time periods, for example, within about a month previous to the date of implementing the training step. The data is validated and gathered from different types of defined sources. Preferably, the ontology training process 1 is not executed until a certain, predefined amount of data is gathered for the training. For example, a configured scheduler may monitor the data gathering process and count the number of records or amount of data added. When the number of records or amount of data in the sample data set 201 reaches that predetermined amount, the scheduler may execute the ontology training process 1.

Once the sample data set 201 is fully developed, the training may begin. At step 301, the sampled data set 201 for each planned ontology 200 is fed into the training module 300. The module 300 then identifies scripts 302 within the sample data set 201. Scripts are lengthy, repeated patterns that appear in the data set 201. For example, a standard phrase spoken by a customer service agent, such as "Hello, how can I help you?" may comprise a script. Next, the module 300 executes a zoning process 303 that segments conversations within a defined corpus, or data set, into meaning units. Meaning units 68 are sequences of words that express an idea, such as may be the equivalent of sentences. An example of a meaning unit in a customer service context would be the customer statement "I would like to buy a phone."

After the zoning process has been completed for the sample data set 201, the module 300 executes term extraction 304. Term extraction 304 is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, the module 300 executes a pre-ontology step 305 that tags all overlapping terms in a non-overlapping way. Longer terms are generally preferred over shorter ones. For example, the term "my phone number" is counted as one term, rather than two—i.e. "my phone" and "my phone number."

Following the pre-ontology process step 305, the module 300 processes the sample data set 201 to identify context vectors 306. Context vectors 306 are linkages between defined terms in the corpus, or data set, and the words that appear before or after each term. For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so called left and right context vectors contain the predictive words for a main term, also referred to as a pivot term.

Identifying context vectors 306 forms the basis for the next step, building dendrograms 307, which is building a hierarchical clustering of terms. The training system uses the premise that terms that share contextual similarity and have similar linguistic characteristics share the same general meaning. In other words, terms with similar context vectors may be synonyms (e.g., purchase/buy), conceptually interchangeable (e.g., days, dates, locations), ontologically similar (e.g., financial transactions). Terms that share these characteristics are good candidates to be inserted in the ontology as a group of terms with similar meanings. In order to accomplish that, the system scans the context vectors of all terms created in the previous phase and clusters together terms with similar context vectors. A dendrogram, for example, may center around the term "purchase." The left context vector (preceding term) may be "want to", "need to", etc. While the right context vector (following term) may be "an i-phone", "the service", "high-speed internet." Initially, all detected terms in the corpus are located with similar terms in clusters on the dendrogram. Then, the dendrogram is transformed into a contextual similarity tree that only contains the stronger similarity clusters of the original dendrogram based on a similarity score algorithm that scores the similarity of the terms in the associated context vectors. During this transformation process, some terms are eliminated and some are grouped or merged with other meaningful terms. Preferably, the minimum number of terms in a dendrogram cluster is four, in order to provide a meaningful analysis of the grouped terms. By way of example, the following terms "purchase" and "buy" have similar context vectors:

Term: Purchase Left Context Vector (Before Term): Want To, Need To, Have To
   Right Context Vector (After Term): An i-Phone, The Service, High-Speed Internet
Term: Buy Left Context Vector (Before Term): Want To, Need To, Must
   Right Context Vector (After Term): i-Phone, High-Speed Internet, A Service That These two terms would be combined into one dendrogram cluster. The ontological premise is that there is a contextual similarity between these terms and therefore, they are clustered together. A set of dendrogram clusters can be presented as a hierarchical structure, such as a tree structure, where terms and clusters that are related are placed near one another in the structure.

After the dendrogram 307 development, relations 308 are developed within the sample data set 201. Relations 308 are linkages or relationships between the defined terms in the corpus. For example, "cancel>account," "speak with>supervisor," and "buy>new iPhone" are exemplary relations 308. The system defines a concise number of strong, meaningful relations according to certain pre-defined policies or rules. Those strong relations are given a higher score, and thus are given preference over other, lower-scoring relations.

Then, based upon the established relations 308, the system identifies, or surfaces, themes 309 appearing within the dataset. Themes 309 are groups or categories of relations that are similar in meaning. A theme 309 represents a concept and is defined by its associated relations. A theme encapsulates the same concept among several interactions. Themes 309 allow users to easily and efficiently understand the characteristics of interactions throughout the corpus. For example, the theme "got an email" might correspond to several relations, including "got the email," "got confirmation," "received an email," "received an email confirmation," etc. In a call center data set, for example, one theme may represent a concept expressed in several different calls. In that way, a theme can provide a summary, or a compressed view, of the characteristics of the interactions in a communications data set. Preferably, a relation is assigned to only a single theme. Additionally, preferably only relations are tagged in the tagging phase 3 of a corpus. Themes are used in the analytics phase 4, and act as building blocks employed by analytics applications or modules.

Specifically, in one embodiment, themes can be identified using the following algorithm, or method. First, the term pairs, or relations, in a corpus are scored according to the following algorithm:

$$\text{score}(term1, term2) = \frac{\text{joint\_count}(term1, term2) \times \text{length\_in\_letters}([term1\ term2])}{\text{average\_distance}(term1, term2) + 1}$$

In the above algorithm, "joint count" represents the number of times the terms appear together in the specified order in the dataset (or a designated subset of the dataset), the "length in letters" represents the length of the words (letters or characters), taken together, in the term set (or relation). Those numbers are multiplied together and divided by the "average distance" between the terms plus 1. The average distance may be calculated as the average number of words that appear between the two terms. Alternatively, the average distance could be calculated as the average number of letters or characters between the two terms. Strong, or high scoring, term sets are those that are long (have many letters) with high appearance count and that appear close together. Low scoring term sets are short, appear infrequently, and are far apart in the data set (indicating loose context). High scoring term pairs, or relations, are valued over low scoring pairs.

After the relations, or term pairs, are scored, the relations are listed in descending order based on that score. That list of scored relations is then truncated so that only a certain number of top scoring relations are maintained. For example, the list may be truncated to retain a pre-defined constant number of relations. Alternatively, a predefined percentage of the relations may be kept. Before or after the list is truncated, the scores for each of the relations in the list may be normalized by assigning them a new score according to their rank in the list. Preferably the score is normalized in descending order, with the best pair (highest scoring term pair) receiving the highest normalized score and the worst pair (lowest scoring term pair) receiving the lowest normalized score.

Figure 3:
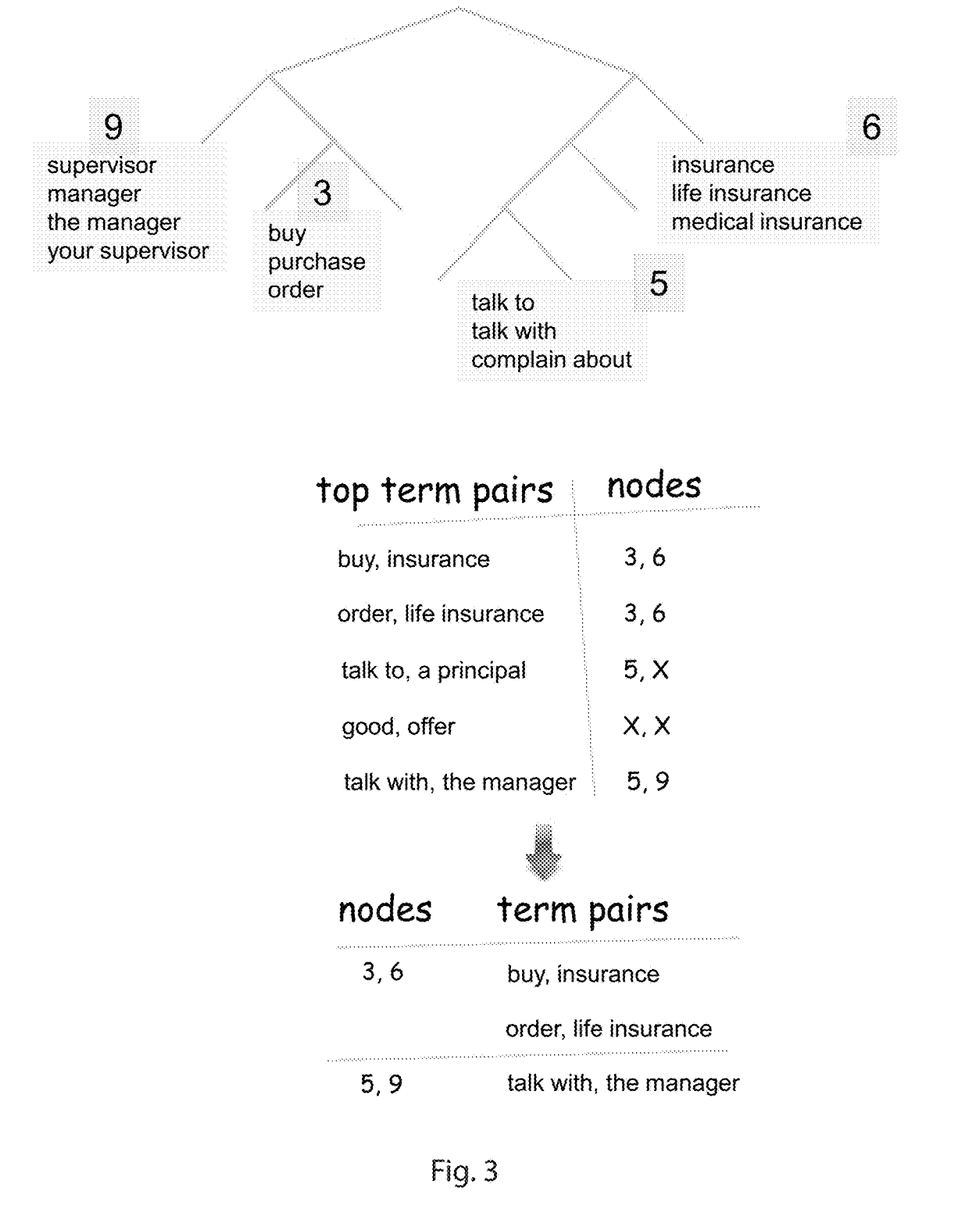
FIG. 3 depicts an exemplary embodiment of a dendrogram.

Then, for each term of each relation in the list, the corresponding dendrogram cluster, or parent node, if it exists, is identified. If found, the term pair is assigned to the identified dendrogram nodes pair, and a list of nodes is developed. Relations, or terms pairs, belonging to the same nodes pair can be grouped together. For example, as seen in FIG. 3, each dendrogram cluster receives a node number. Each term pair is then correlated with its corresponding node, or dendrogram cluster, pair. For instance, in FIG. 3 the term pair buy>insurance and order>life insurance both correlate to the node pair 3>6. Accordingly, those term pairs could be grouped together and identified according to their node pair.

As is also illustrated in FIG. 3, some terms may not correspond to any dendrogram cluster and thus may not have a corresponding node number. For example, in FIG. 3 the term pair talk to>a principal, the term "a principal" was not identified as being associated with any dendrogram cluster and thus did not receive a node number. In those instances node numbers may still be identifiable, or associatable, if the unassociated or un-grouped terms can be affiliated with node pairs or dendrogram clusters having textually similar terms. Such affiliation can be assessed by using character trigram similarity, which compares the literal similarity between the words in two separate relations or terms. Character trigram similarity assesses the similarity of words by assessing the words in the terms together, and specifically by comparing the letters of each of the words in each of the relations with one another. One way to do that is by parsing the relations or terms into letter triplets and determining whether those letter triplets appear in each relation or term. The character trigram similarity of two terms can be assessed according to the following algorithm:

$$\text{similarity}(a, b) = \frac{\sum_{trigram\ t \in a,b} \min(\text{count of } t \text{ in } a, \text{count of } t \text{ in } b)}{\text{number of trigrams belonging to } a + \text{number of trigrams belonging to } b}$$

In this way, the letter strings in each term are compared and their similarity is determined. Terms that have sufficiently similar letter strings in them are grouped together, for example in the same dendrogram cluster, or node. Thereby, previously unassociated terms can be placed into a group.

Preferably, the themes are expanded to incorporate as many of the identified terms and relations as possible. Since data sets may commonly be derived from speech-to-text translation algorithms, and because those algorithms are imperfect and often make slight mistranscriptions, it is desirable to use algorithms that can associate textually similar terms together—e.g., managers and manager, Sunday and Monday. Thus, as described above, unassociated relations can be assimilated into the established node groupings by comparing them with the already-grouped relations, for example using character trigram similarity. For relations that remain unassociated after such a comparison with the already-grouped relations, additional associations can be made by comparing the unassociated relations with one another. For example, the character trigram similarity algorithm can be used to compare and group the unassociated relations with one another. In some embodiments, the threshold for clustering or grouping these previously unassociated relations may be higher than the threshold for grouping the unassociated relations with the already-grouped relations. After all comparisons are completed, relations whose terms do not have any similarity linkages to other terms and thus cannot be clustered with other relations, are discarded as unimportant Once all of the terms are placed into node number pairs or are discarded as unimportant, the remaining list of node number pairs indicates groups of term pairs. This list could appropriately be termed a list of "theme candidates" because it contains groups of relations that could potentially be identified as themes. The list of theme candidates can be paired down using any number of techniques. For example, the theme candidates can be scored by averaging the scores (or normalized scores) of its original term pair members. Alternatively or additionally, the list of theme candidates can be compared to a pre-created, or "canned", list of important terms or themes. The "canned" list can be one that is created based on similar datasets, for example based on datasets belonging to another user in the same or similar industry. The theme candidates that appear on the "canned" list of important themes or terms could then be elevated as important, or high scoring, themes. Likewise, the list of theme candidates could be compared to a "canned" list of unimportant terms. The theme candidates that appear on the list can be removed, and purged because they are insignificant and do not add anything to the analysis. Additionally, the theme candidates could be scored based on their number of members, with the candidates having the most members receiving the highest score. The theme candidates can also be scored according to their entity consensus, where themes having terms that belong to the same entity or groups of entities are scored higher than those with terms belonging to disparate entities. Another scoring means is by diversity, where themes with a greater number of unique terms on either side of the relations receive a higher score. Further, the list of theme candidates can also be refined by a user, for example, at the ontology administration stage 2. In one embodiment, the theme candidates are scored according to a number of different metrics, such as those listed above, and the then the scores are added together or averaged to calculate a final score. The theme candidates with the highest final scores can then be classified or identified as themes and used as a foundation for the analytics structure.

Figure 4:
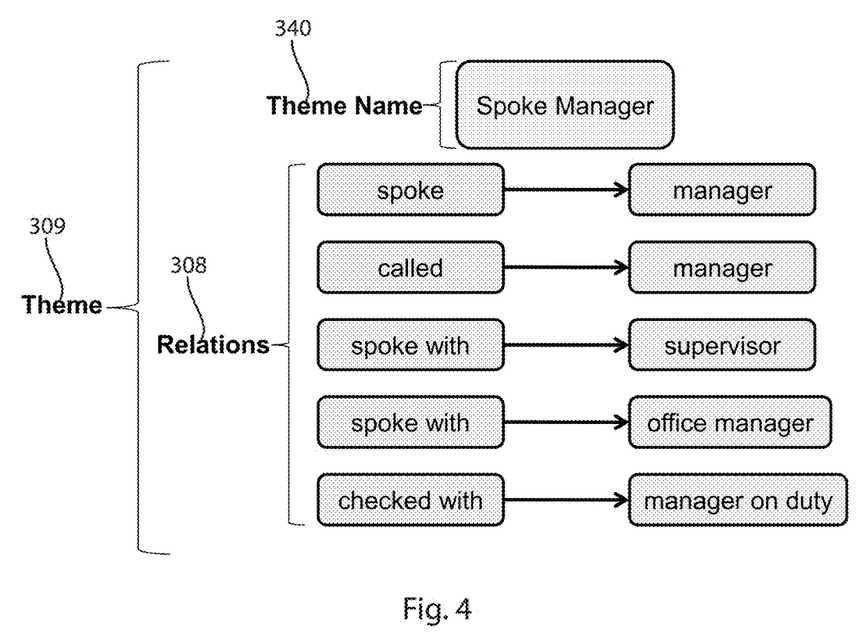
FIG. 4 is an exemplary display conveying information about themes in a dataset.

Themes can be displayed by displaying all of the relations comprising that theme and providing statistics about the appearance of such relations and/or the terms therein. In order to display a theme, or to create useful user interfaces displaying and conveying information about themes and about a group of themes in a dataset, each theme should be given a unique identifier, or theme name. For example, as seen in FIG. 4, information about themes 309 and relations 308 in a communication data set can be displayed by displaying the terms therein and connecting them with lines. Exemplary FIG. 4 demonstrates a display showing the theme name 340, data about the theme in the corpus, and the relations that comprise the theme.

Figure 5:
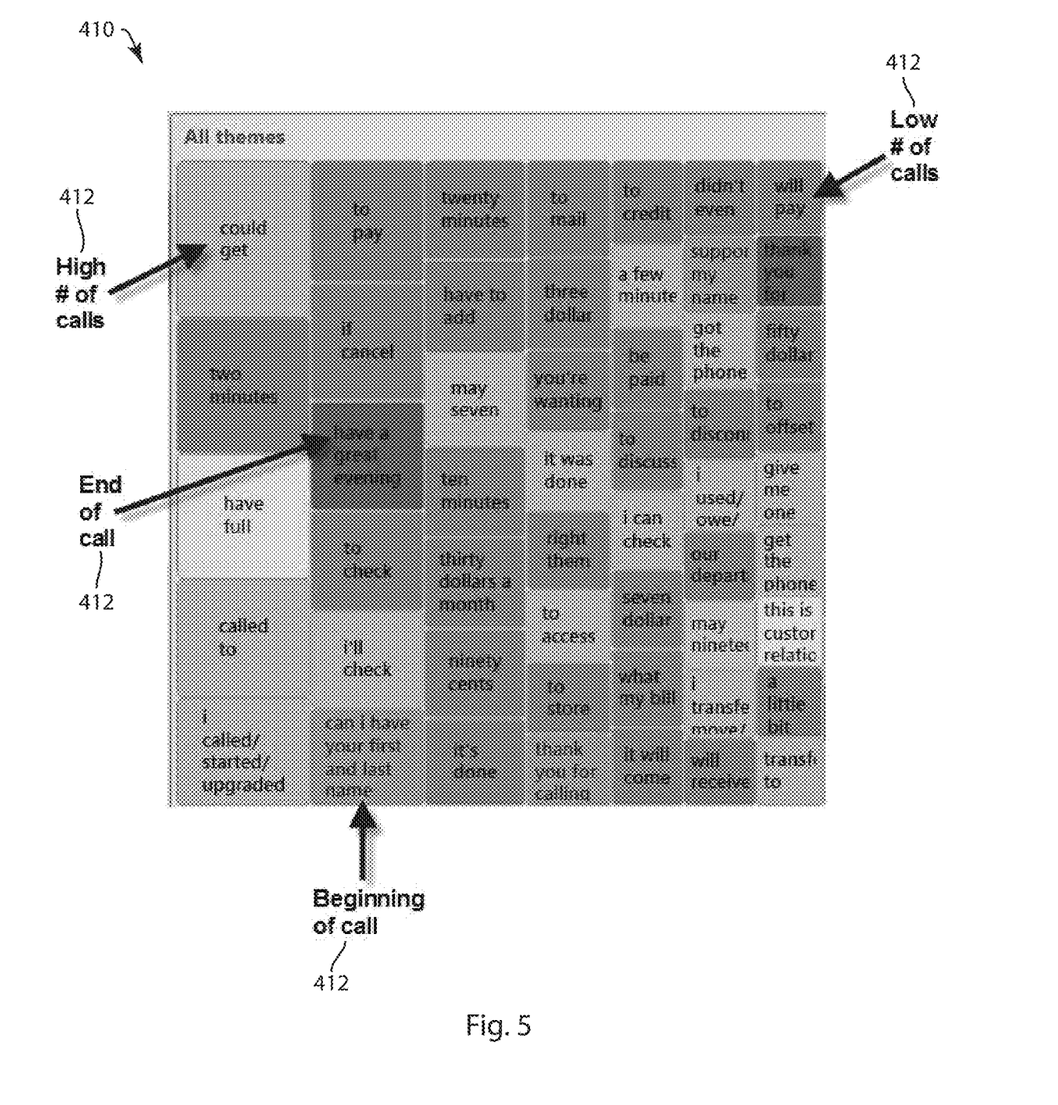
FIG. 5 is another exemplary display conveying information about themes in a dataset.

The theme name 340 is an identifier for the theme 309 that may be used, for example, in user interfaces as a shortcut for conveying information about the theme 309 using only a short string of words and/or characters. For example, as seen in FIG. 5, the theme names 340 can be used in a Tree Map 410, which indicates key data about a large number of themes at one glance. The theme name 340 can be established by any number of methods. For example, the theme name 340 can be created based on the top relation or relations in the dataset, or a particular subset of the dataset being analyzed. Determination of the top relations may be based on any number of factors, or a combination thereof. For example, the top relations may be those receiving the highest term pair score (described above). Alternately, the top relations may be the most common relations from that theme appearing in the dataset. In still other embodiments, the top relations may be those with the highest normalized scores, or the highest final scores (described above).

Turning back to FIG. 4, the theme name 340 is devised by concatenating the terms of the first relation—"spoke" and "manager". In another embodiment, the name 340 may be created from, for example, the top three relations. In FIG. 4, assuming that the relations are listed in descending order with the top scoring relations listed first, the top three relations would be "spoke>manager", "called>manager" and "spoke with>supervisor". The theme name can be created from the terms in these three relations, for example by pairing the terms of the relations so that each of the first terms of the relation are listed together and each of the second terms are listed together. Implementing such a method, the theme name 340 for the theme in FIG. 4 could be, for example, "spoke, called, spoke with>manager, supervisor". In still other embodiments, the terms of the top relations could be collected and concatenated in other ways. The purpose of using more than the top relation in the theme name may be to ensure that the entire sentiment or idea of the theme is expressed. The top relation in the dataset may not be enough to encompass the entire idea of the theme, and thus using two or more of the top relations may lead to more accurate names. However, using multiple relations to create the names may lead to longer, more cumbersome names that are hard to incorporate into user interfaces. Thus, it may be desirable to use shorter names based on the top relation in certain analytics functions or displays, while using the longer, potentially more accurate names in other analytics functions or displays.

Further detail may be added to the display to convey additional information about the theme. For example, the strength of the connections between words is illustrated by the thickness of the line. The terms could be grouped by entity, so that, for example, all of the "objects" are aligned in one column and connected with all of the "actions" aligned in another column. Additionally, each relationship, or connection between terms, could be labeled or described. For example, connections between employees and customers they have served can be identified as a particular relationship. Other relationships might be identified as being related to a complaint, related to a contractual obligation (e.g. a warranty or service contract), etc.

Additionally, multiple themes can be viewed at one time. For example, all of the themes represented in a corpus may be displayed. Alternatively, a portion of the themes could be displayed, such as the most common themes or the themes most related to a particular term or theme, such as a term or theme identified by a user. In one embodiment, depicted in FIG. 5, themes can be viewed in a Theme Visualization Tree Map 410. Any number of user interface mechanisms can be employed to allow a user to interact with and display the tagged data, and the interface mechanisms can be designed to incorporate any number of data formats according to what type of data is incorporated in the communications data set. As demonstrated in FIG. 5, the Tree Map 410 provides users with a tool to visualize customer service call data. Using the Tree Map 410, user can select different view of the same data related to themes 326 and their associated relations 328. By selecting different performance metrics, filtering the data set to view related themes, and drilling down to view detailed information about a specific theme, the user can gain different perspectives on the data. In still other embodiments, the theme visualization could be in a list view, wherein theme data is displayed in a table format. Such a table could include theme names, the number of interactions with which each theme is associated, the percentage of the interactions in the data set in which each theme appeared, the relations associated with that theme, and the importance of that theme in signifying or representing the overall purpose of the interaction.

Figure 6:
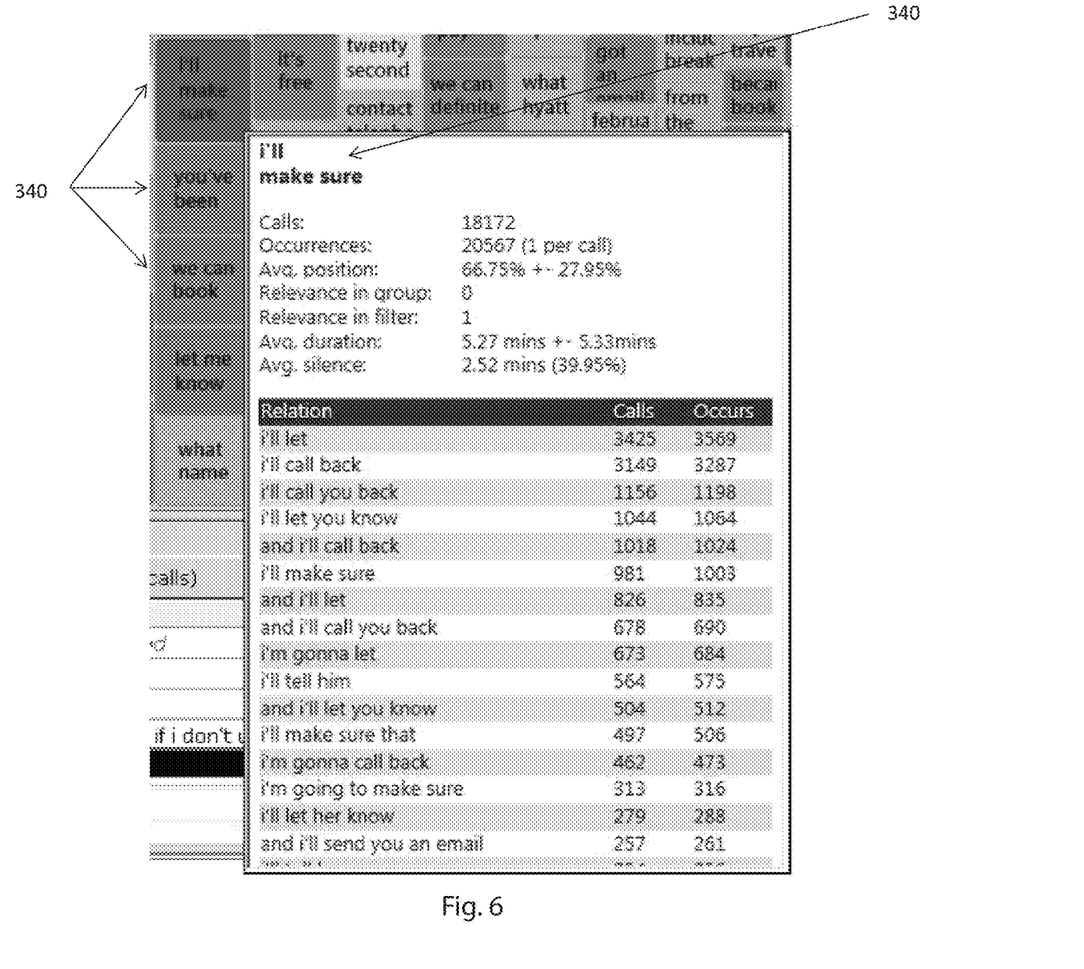
FIG. 6 is an exemplary display conveying information regarding an exemplary theme.

As seen in FIGS. 5 and 6, the user can use the Tree Map 410 to view theme performance according to certain selected metrics 412. This exemplary communication data presented in FIG. 5 regards customer service call data, and the exemplary metrics regarded in the display are "average position in call" and "number of calls." However, it is contemplated that the Tree Map display could be applied to any number of metrics regarding any type of data, including duration of interaction associated with a theme or percentage of silence (period where neither employee or customer is communicating) associated with a theme 309. The Tree Map 410 employs a color/size coding scheme to convey information about themes 309 according to the selected metrics. In FIG. 5, themes found in a relatively high number of calls are displayed in a relatively large cell, whereas themes that rarely appeared are displayed in relatively small cells. Color coding is used to show where the themes fell within the span of the calls in the processed data set. For example, cells shaded orange and/or or red could be used to represent themes that typically appeared relatively early in the call, whereas yellow and/or green could represent themes that typically fell relatively late in the call.

In some embodiments, the Theme Visualization Tree Map 410 (or any other display mechanism) can be employed to allow a user to view theme statistics, view and/or play snippets of a communication, or filter and chart themes or theme statistics. Useful statistics may include, for example, the total number of interactions associated with a theme or a theme's relations, the number of occurrences of the theme or the theme's relations in a call set, etc. FIG. 6 presents a more detailed view of exemplary data about a particular theme identified in the Tree Map 410 of FIG. 5. For example, upon a user selecting a theme, or theme name 340, on the Tree Map 410 the more detailed information of FIG. 6 can be presented. As shown in FIG. 6, for the theme named "I'll make sure," the average duration of the call is 5.27 minutes, the theme appeared in 18172 calls, and the theme occurred a total of 20567 times (appeared more than once in some calls).

Specifically, several exemplary statistical categories are identified in FIG. 6. Calls represent the total number of interactions associated with the theme, and total number of interactions associated with a specific relation assigned to the theme. Occurrences represent the total number of times the theme appears in the call set, and the number of times the specific relation appears in the call set. The Average Position is the average position within the interaction that the tracked items in the theme appear (beginning, middle, end). In this example, the tracked items in this theme seem to appear in the middle of the interaction, and a little beforehand. Relevance in group/filter indicates how relevant the theme is in a specific group or selected filter. Average duration is the average call duration of all of the interactions tagged by this theme. Avg. silence is the average amount of silence time per interaction for all of the interactions tagged by this theme. Further, below the statistical data regarding the theme, a list of the relations associated with the theme conveys the total number of interactions in which each listed relation was detected and the number of times that relation occurred in the corpus.

Additionally, themes can be filtered to identify and view those themes that correlate or relate to, or contain a similar set of relations to, a particular theme. Filtering themes could allow a user to view themes that are correlated or related to one another, for example by listing the correlated themes, identified by theme name, in descending order, with the most correlated theme(s) being identified first. Alternatively or additionally, a user could view which themes are associated with different types of interactions, such as long calls or calls with long silent periods. Additionally, a user could view all calls with a high prevalence of a certain theme. For example, a user could select the theme "Emotion" (e.g., from a Tree Map 410) from a dataset comprised of customer call data, and the system would display details about calls that included terms and relations associated with the "Emotion" theme—i.e. called that included emotional words such as "upset," "frustrated," or "happy." Further, the filter could further be employed to identify datasets where two themes appear near one another. For example, where the "Emotion" theme appears near to the "Speak with supervisor" theme.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for computer learning through developing and implementing an ontology to display and create search protocol, the method comprising:

a processor receiving a plurality of communication data, wherein each of the plurality of communication data is an instance of an exchange between at least one agent and at least one customer;

transforming each of the plurality of communication data to a data set formatted for training;

identifying scripts within the received data set;

executing a zoning process that segments conversations within the data set into meaning units;

executing a term extraction process that reviews the meaning units and extracts the terms that are meaningful in the dataset;

executing a pre-ontology process that tags the terms that overlap;

processing the data set to identify context vectors, wherein context vectors are links between the terms and the words that appear before or after each term in the data set;

building a dendrogram by scanning the context vectors of the terms and clustering together terms with similar context vectors;

transforming the dendrogram into a contextual similarity tree that only contains the stronger similarity clusters of the original dendrogram, wherein a strength of the similarity clusters is based on a similarity score algorithm that scores the similarity of the terms in the associated context vectors;

developing relations within the data set, wherein the relations are links between the defined terms in the data set;

identifying themes appearing within the data set based upon the relations and the transformed dendrogram; and using a graphical user interface to display the themes appearing within the data set allowing a user to search the plurality of communication data for specific instances of the theme.

2. The method of claim 1 further comprising creating a unique theme name for each theme, wherein each theme name conveys the subject matter encapsulated in the relations in that respective theme.

3. The method of claim 2, wherein each theme name includes the terms of the relation in that theme that appears most frequently in the dataset.

4. The method of claim 2, wherein each theme name includes the terms of the relation in that theme that received the highest similarity score.

5. The method of claim 2, wherein each theme name includes the terms of the top three relations in that theme based on similarity scores.

6. A system for automated language model adaptation implementing an ontology training module to display and create search protocol, the system comprising:
   a communication interface configured to receive a plurality of communication data comprising a plurality of instances of data exchanged between at least one agent and at least one customer;
   a processor;
   at least one graphical user interface; and
   a memory coupled to the processor, the memory storing instructions which when executed by the processor cause the system to perform the ordered steps comprising:
      transforming each of the plurality of communication data to a data set formatted for training;
      identifying scripts within the received data set;
      executing a zoning process that segments conversations within the data set into meaning units;
      executing a term extraction process that reviews the meaning units and extracts the terms that are meaningful in the dataset;
      executing a pre-ontology process that tags the terms that overlap;
      processing the data set to identify context vectors, wherein context vectors are links between the terms and the words that appear before or after each term in the data set;
      building a dendrogram by scanning the context vectors of the terms and clustering together terms with similar context vectors;
      transforming the dendrogram into a contextual similarity tree that only contains the stronger similarity clusters of the original dendrogram, wherein a strength of the similarity clusters is based on a similarity score algorithm that scores the similarity of the terms in the associated context vectors;
      developing relations within the data set, wherein the relations are links between the defined terms in the data set;
      identifying themes appearing within the data set based upon the relations and the transformed dendrogram; and
      using the graphical user interface to display the teams appearing within the data set allowing a user to search the plurality of communication data for specific instances of the theme.

7. The system of claim 6, wherein the instructions, when executed, further cause the system to create a unique theme name for each theme, wherein each theme name conveys the subject matter encapsulated in the relations in that respective theme.

8. The system of claim 7, wherein each theme name includes the terms of the relation in that theme that appears most frequently in the dataset.

9. The system of claim 7, wherein each theme name includes the terms of the relation in that theme that received the highest similarity score.

10. The system of claim 7, wherein each theme name includes the terms of the top three relations in that theme based on similarity scores.

11. A non-transitory computer-readable medium, in which program instructions are stored, which instructions, when executed by one or more processors, cause the processors to perform the ordered steps comprising:
    Receiving a plurality of communication data through a communication interface;
    transforming each of the plurality of communication data to a data set formatted for training;
    identifying scripts within the formatted data set;
    executing a zoning process that segments conversations within the data set into meaning units;
    executing a term extraction process that reviews the meaning units and extracts the terms that are meaningful in the dataset;
    executing a pre-ontology process that tags the terms that overlap;
    processing the data set to identify context vectors, wherein context vectors link the terms and the words that appear before or after each term in the data set;
    building a dendrogram by scanning the context vectors of the terms and clustering together terms with similar context vectors;
    transforming the dendrogram into a contextual similarity tree that only contains the stronger similarity clusters of the original dendrogram, wherein a strength of the similarity clusters is based on a similarity score algorithm that scores the similarity of the terms in the associated context vectors;
    developing relations within the data set, wherein the relations are links between the defined terms in the data set;
    identifying themes appearing within the data set based upon the relations and the transformed dendrogram; and
    displaying the themes appearing within the data set to a graphical user interface that allows a user to search the plurality of communication data for specific instances of the displayed themes.

12. The non-transitory computer-readable medium of claim 11, wherein the instructions, when executed, further cause the processors to create a unique theme name for each theme, wherein each theme name conveys the subject matter encapsulated in the relations in that respective theme.

13. The non-transitory computer-readable medium of claim 12, wherein each theme name includes the terms of the relation in that theme that appears most frequently in the dataset.

14. The non-transitory computer-readable medium of claim 13, wherein each theme name includes the terms of the relation in that theme that received the highest similarity score.

15. The non-transitory computer-readable medium of claim 14, wherein each theme name includes the terms of the top three relations in that theme based on similarity scores.

* * * * *